United States Patent [19]
Barclay et al.

[11] 4,256,380
[45] Mar. 17, 1981

[54] COUNTER ELECTRODE ARRANGEMENT OF AN ELECTROCHROMIC DISPLAY DEVICE

[75] Inventors: Donald J. Barclay, Winchester; Anthony C. Lowe, North Baddesley; David H. Martin, Hants, all of England

[73] Assignee: International Business Machines Corporation, Armonk, N.Y.

[21] Appl. No.: 77,425

[22] Filed: Sep. 20, 1979

[30] Foreign Application Priority Data

Dec. 20, 1978 [GB] United Kingdom ............... 49274/78

[51] Int. Cl.³ .................................................. G02F 1/17
[52] U.S. Cl. ..................................... 350/357; 340/785
[58] Field of Search ................. 350/357; 340/763, 785

[56] References Cited

U.S. PATENT DOCUMENTS

| 4,147,416 | 4/1979 | Shimizu | 350/357 |
| 4,167,308 | 9/1979 | Barclay et al. | 350/357 |
| 4,167,309 | 9/1979 | Barclay et al. | 350/357 |
| 4,175,836 | 11/1979 | Redman et al. | 350/357 |
| 4,215,918 | 8/1980 | Dove | 350/357 |

*Primary Examiner*—James W. Davie
*Attorney, Agent, or Firm*—Joseph E. Kieninger

[57] ABSTRACT

An electrochromic display device comprises a single counter electrode and a plurality of display electrodes. The counter electrode is charged and is maintained at a given potential by a donor electrode which transfers charge to the counter electrode in response to the action of a reference electrode. A potentiostat operates to supply current to the donor electrode in accordance with the potential of the counter electrode as sensed by the reference electrode. Both the donor electrode and the counter electrode are preferably of platinum black. The donor electrode is preferably arranged in the manner of a frame about the display area. The counter electrode is preferably grid-shaped.

7 Claims, 3 Drawing Figures

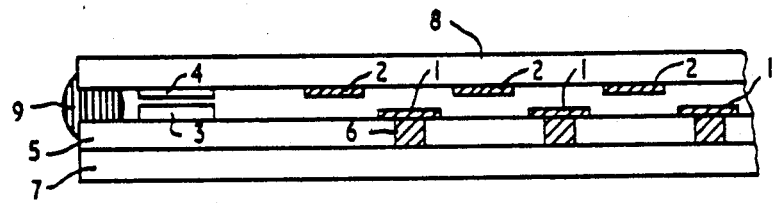
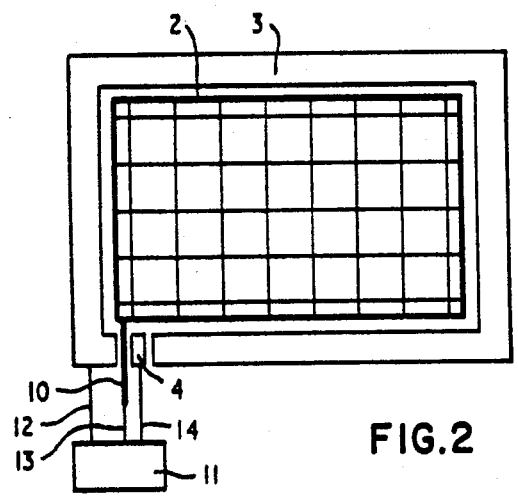
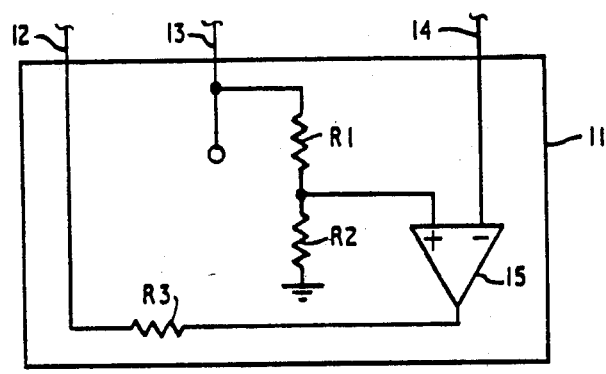

COUNTER ELECTRODE ARRANGEMENT OF AN ELECTROCHROMIC DISPLAY DEVICE

DESCRIPTION

Technical Field

This invention relates to electrochromic display devices and more particularly to a counter electrode arrangement of an electrochromic display device.

It is a primary object of this invention to provide an improved electrochromic display device.

It is another object of this invention to provide an electrochromic display device with a simple counter electrode charging system.

It is still another object of this invention to provide a counter electrode system that ensures no charge loss at the counter electrode.

Background Art

For the purposes of this specification, an electrochromic display device is a device in which the display effect is achieved as a consequence of a redox reaction. One class of such devices uses a liquid electrolyte containing viologen and a suitable anionic material. Upon application of the appropriate potential between a display electrode and the counter electrode, the viologen dication is reduced to the radical cation which then combines with the anionic material and forms an insoluble colored film on the display electrode. The process is reversible. Inorganic materials, especially transition metal compounds such as $WO_3$ and $MoO_3$, are also useful.

In a typical electrochromic display device there are a plurality of display electrodes and, usually, a single counter electrode. Although suggestions have been made to provide electrochromic display devices with the display elements at the crosspoints of orthogonal sets of electrodes, the problems of electrochemically isolating each crosspoint are formidable. In order to operate a display device with a single counter electrode efficiently, it is necessary that the potential difference between the counter electrode and each display electrode be substantially the same.

Two factors militate against this: potential drop in the electrolyte, and a potential drop along the counter electrode itself. If the device is sufficiently small—for example, a wrist watch display—it is possible to locate the counter electrode anywhere in the electrolyte, but if the difference in the distances between the counter electrode and the nearest and most remote display electrodes is large (for example greater than 1 cm.) the potential drop in the electrolyte may have a significant effect on operation of the device. The effect is most marked in the case of erasure, i.e. removing the deposited material from the display electrodes. If the potentials are chosen to erase completely the remotest display electrode, this can result in nearer electrodes being over-erased, with evolution of oxygen and other undesirable reactions. It should here be pointed out that, since deposition of material necessarily involves charge deposition on the display electrodes, they can in theory be erased simply by short circuiting the display electrodes to the counter electrode. This is too slow for practical purposes and does not in any case lead to complete erasure because of the difficulty in ensuring no charge loss at the counter electrode. In practice, therefore, display electrodes are preferably erased by reversing the write (deposition) potential.

It is, of course, possible to overcome the problem of different potential drops between counter electrode and different display electrodes by providing different potentials at different display electrodes or at different sets of display electrodes, grouped according to their distance from the counter electrode. However, this substantially increases the complexity, cost, and unreliability of the driving circuitry. A better solution would seem to be to provide a counter electrode which is equidistant from all display electrodes.

Tin oxide or similar transparent conductive materials have been coated on the inner face of the transparent sheet through which the display electrodes are viewed. This arrangement eliminates the problem due to the potential drop in the electrolyte, but due to the resistance of the tin oxide, introduces the problem of the different potential drops in the counter electrode between the potential source and the regions of the counter electrode interacting with different display electrodes.

The most satisfactory solution known to the applicant is to make the counter electrode as conductive as possible and to charge it to a given potential.

In the co-pending application Ser. No. 877,219 filed Feb. 13, 1978 and assigned to the assignee of this invention, now U.S. Pat. No. 4,167,309, a design of counter electrode is proposed which, although the electrode consists of conducting opaque material and is located on the underside of the transparent sheet through which the display electrodes are viewed, does not prevent adequate viewing of the display. Preferably, the counter electrode is a grid, each square encompassing one or more display electrodes. Other shapes involving curved lines are disclosed. It is suggested that the counter electrode be charged by incorporating a redox couple in its structure. This is, however, difficult to implement and unreliable in operation.

The co-pending application Ser. No. 877,220 filed Feb. 13, 1978 and assigned to the assignee of this invention, now U.S. Pat. No. 4,167,308, deals with the problem of charging the counter electrode. A secondary redox system senses the charge on the counter electrode and transfers charge to the counter electrode when its potential falls. The proposed system is, however, rather complex and, in its preferred form, requires an ion-exchange membrane to separate the secondary redox system from the redox system providing the display while maintaining operative connection between the systems.

BRIEF DESCRIPTION OF THE DRAWINGS

In the accompanying drawings forming a material part of this disclosure:

FIG. 1 is a schematic part cross-section of an electrochromic display device according to the invention;

FIG. 2 is a schematic plan of a display device according to the invention, showing the arrangement of the electrodes; and FIG. 3 is a circuit diagram of a potentiostat.

DISCLOSURE OF THE INVENTION

For further understanding of the invention and of the objects and advantages thereof, reference will be had to the following description and accompanying drawings, and to the appended claims in which the various novel features of the invention are more particularly set forth.

According to the invention, an electrochromic display device includes a counter electrode which, in operation, is maintained charged to a given potential, and a donor electrode which, in operation, transfers charge to the counter electrode, the display device being characterized by a reference electrode, arranged in operation to sense the potential of the counter electrode, and by electric circuit means, responsive to the potential sensed by the reference electrode to cause the donor electrode to transfer charge to the counter electrode so as to maintain the counter electrode at the given potential.

Preferably, both the donor and counter electrodes are of a high specific surface area material, preferably platinum black. Specific surface area is the proportion of the actual surface area to the plane area bounded by the edges of the electrode. A rough material has a high specific surface area.

The counter electrode may take any of the shapes described in the co-pending application Ser. No. 877,219, U.S. Pat. No. 4,167,309, but the invention is not limited to any form of counter electrode.

The donor electrode may be arranged as a frame about the viewing area of the display device and may be controlled, in response to the potential sensed by the reference electrode, by an arrangement known in electrochemistry as a potentiostat.

Best Mode for Carrying Out the Invention

FIG. 1 is a schematic part cross-section of an electrochromic display device according to the invention. Essentially the device consists of selectively addressable display electrodes 1, a counter electrode 2, a donor electrode 3 and a reference electrode 4. The display electrodes 1 are located on a suitable substrate 5, through which lead conductive vias 6 which connect the respective display electrodes 1 to address circuitry (not shown) located in a plane 7. The address circuitry is not part of the invention and is conventional. Depending on the spacings and numbers of the display electrodes 1, the address circuitry may be conductors connecting the respective vias 6 to address gates, or may be semiconductor switches, one to each display electrode 1, arranged in a matrix. For details of suitable addressing circuitry, reference may be made to British Patent Specifications 1,509,478 and 1,517,940. A donor electrode 3 is located at the periphery of substrate 5, and is preferably made of platinum black. Preferably the donor electrode 3 surrounds area occupied by the display electrodes 1 in the manner of a picture frame. A transparent plate 8 supports the counter electrode 2 and, as shown, the reference electrode 4. The plate 8 is hermetically sealed to substrate 5 by any suitable sealant 9. The space between substrate 5 and plate 8 is filled with a suitable electrolyte such as heptyl viologen dihydrogen phosphate-hypophosphite, as disclosed in the co-pending United Kingdom patent application 45500/77 (UK977-018). For filling the device, a capillary (not shown) is embedded in the sealant 9. The periphery of plate 8 may be opaque to hide the donor electrode 3 and reference electrode 4 from view.

FIG. 2 is a schematic plan view of the device, omitting plate 8 and substrate 5, to show the preferred relative dispositions of the counter electrode 2, the donor electrode 3 and the reference electrode 4, and the electrical connections between these electrodes. The counter electrode 2 is of platinum black and is grid shaped, as described in our co-pending application Ser. No. 877,219, with a terminal 10 extending out of the display area through a gap in the donor electrode 3. Terminal 10, donor electrode 3 and reference electrode 4 are all connected to a potentiostat 11.

The function of potentiostat 11 is, by means of reference electrode 4, to sense the potential of counter electrode 2, and to adjust the current between donor electrode 3 and counter electrode 2 to maintain the counter electrode 2 at the required potential. A brief reference to the use of the potentiostat in electrochemistry is to be found at page 204 of *Electrochemical Science* by Bockris and Drazic, London 1972.

A circuit diagram of potentiostat 11 is shown in FIG. 3 in which the conductors connecting the potentiostat to the donor electrodes 3, counter electrode 2 and reference electrode 4 are referenced 12, 13 and 14 respectively. A source of potential $+V$ is connected to conductor 13 which is also connected to ground through the resistor chain R1, R2. The junction of resistors R1, R2 is connected to the positive input of an operational amplifier 15. Conductor 14 from reference electrode 4 is connected to the negative input of the operational amplifier 15, the output of which is connected through a current limiting resistor R3 to conductor 12 and so to the donor electrode 3.

In operation, the resistors R1, R2 define a potential $\delta V = V \cdot R1/(R1+R2)$ at the positive terminal of the operational amplifier 15. When the potential of the counter electrode 2, as sensed by reference electrode 4, drops below this value current flows at the output of the amplifier so that charge is transferred between the donor electrode 3 and a counter electrode 2 until the charge on the counter electrode is sufficient to raise its potential to $\delta V$. Typical values for V, R1, R2 and R3 and 5 V, 10 Kohm, 100 Kohm and 1 Kohm respectively.

The charge transfer between the platinum black counter and donor electrodes 2, 3, is according to the relationship

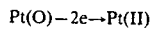

$$Pt(O) - 2e \rightarrow Pt(II)$$

The Pt(II) is present as an insoluble monolayer of PtO, thus eliminating the need for a membrane between the donor and counter electrodes. Although platinum black is the preferred constituent of the electrodes other materials can be used, for example, palladium, rhodium or iridium.

There has been described a counter electrode arrangement for an electrochromic display device, which incorporates a donor electrode and a reference electrode which senses the potential of the counter electrode. When the potential of the counter electrode falls, charge is transferred from the donor electrode. The arrangement is simple to implement and permits reliable operation of electrochromic display devices.

While I have illustrated and described the preferred embodiments of my invention, it is understood that I do not limit myself to the precise steps herein and the right is secured to allow changes and modifications coming within the scope of the invention as defined in the appended claims.

We claim:

1. An electrochromic display device having at least one display electrode comprising an electrolyte associated with the display electrode, a counter electrode in contact with said electrolyte that is maintained charged to a given potential during operation, a donor electrode for transferring a charge to said counter electrode during operation, a reference electrode for sensing the potential of said counter electrode during operation, and electric circuit means responsive to the potential sensed by said reference electrode to cause said donor electrode to transfer charge to said counter electrode so as to maintain said counter electrode at the given potential.

2. A device as claimed in claim 1, wherein both said donor and counter electrodes are of platinum black.

3. A device as claimed in claim 1 wherein the display device includes a transparent sheet through which the display electrode is located on the underside of the transparent sheet in contact with said electrolyte and is in the form of a pattern of lines.

4. A device as claimed in claim 1 wherein said counter electrode is grid shaped.

5. A device as claimed in claim 1 wherein said donor electrode is arranged in the manner of a frame along the periphery of the area occupied by the display electrodes.

6. A device as claimed in claim 1 wherein said electric circuit means is a potentiostat.

7. A device as claimed in claim 1 wherein said electrolyte includes viologen.

* * * * *